United States Patent [19]
Skrivanek et al.

[11] 4,046,222
[45] Sept. 6, 1977

[54] PRESSURE SYSTEM FOR A TRANSMISSION, ESPECIALLY FOR AN AUXILIARY GEARBOX FOR DRIVING AUXILIARY DEVICES IN AIRCRAFT

[75] Inventors: Karl Skrivanek, Oberursel; Klaus Janek, Bad Homburg, both of Germany

[73] Assignee: Klochner-Humboldt-Deutz Aktiengesellschaft, Cologne, Germany

[21] Appl. No.: 585,302

[22] Filed: June 9, 1975

[30] Foreign Application Priority Data
June 7, 1974 Germany .............................. 2427634

[51] Int. Cl.² ............................................. F01M 1/00
[52] U.S. Cl. .................................. 184/6.11; 184/6.12
[58] Field of Search .................... 60/39.08; 244/58; 74/730; 184/6.11, 6.12, 6

[56] References Cited
U.S. PATENT DOCUMENTS

| | | | |
|---|---|---|---|
| 2,566,049 | 8/1951 | Williams | 60/39.08 |
| 2,672,010 | 3/1954 | Newcomb | 60/39.08 |
| 3,269,118 | 8/1966 | Benedict | 244/58 |
| 3,378,104 | 4/1968 | Venable | 60/39.08 |
| 3,394,618 | 7/1968 | Dhonau | 74/732 |
| 3,520,632 | 7/1970 | Brunkhardt | 60/39.08 |
| 3,527,054 | 9/1970 | Hemsworth | 60/39.08 |
| 3,572,356 | 3/1971 | Pinto | 60/39.08 |

*Primary Examiner*—Samuel Feinberg
*Attorney, Agent, or Firm*—Walter Becker

[57] ABSTRACT

A pressure system for a transmission, especially for an auxiliary gearbox for driving auxiliary devices in aircraft, according to which atmospheric air is conveyed into the transmission by a pump which draws in the air through an inlet pressure chamber and a check valve until a sufficient pressure has been obtained in the transmission. When the pressure in the transmission surpasses that desired, the excess air is returned to the inlet pressure chamber.

6 Claims, 1 Drawing Figure

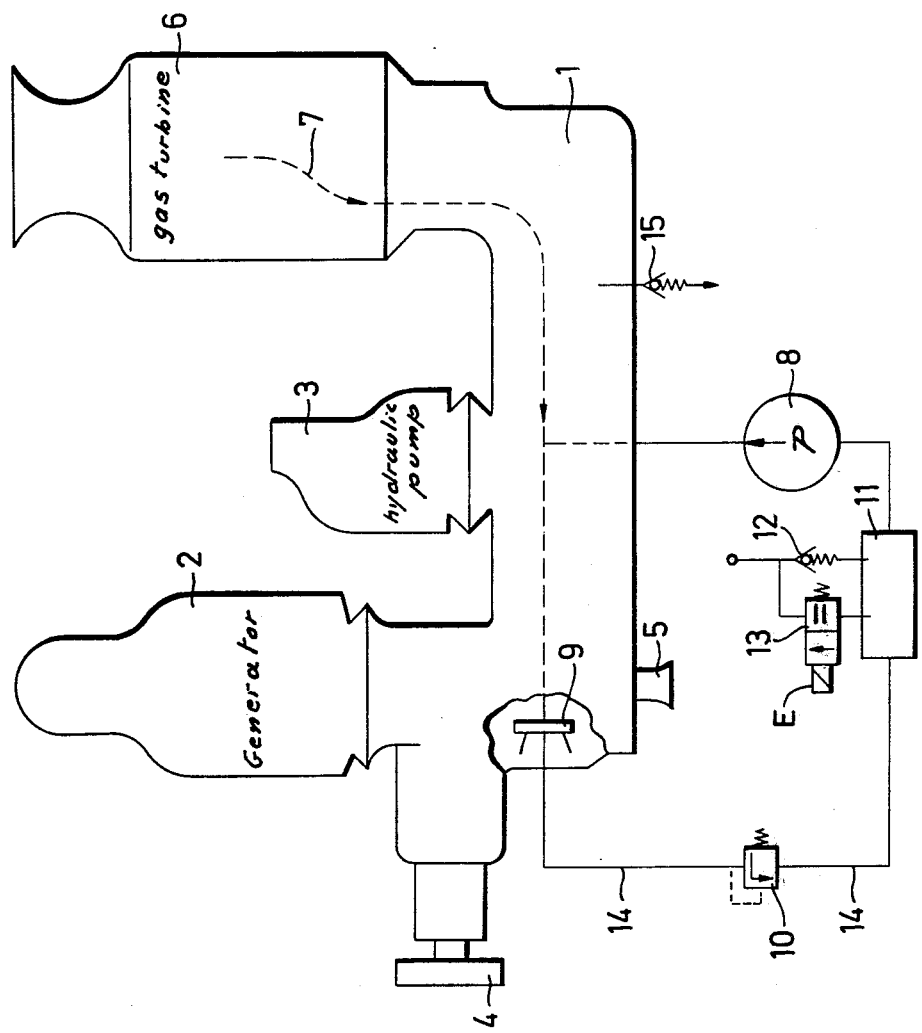

PRESSURE SYSTEM FOR A TRANSMISSION, ESPECIALLY FOR AN AUXILIARY GEARBOX FOR DRIVING AUXILIARY DEVICES IN AIRCRAFT

The present invention relates to a pressure system for a transmission, especially for an auxiliary gearbox for driving auxiliary devices in aircraft.

Such auxiliary gearboxes, especially in high performance aircraft which reach high altitudes, are exposed to large pressure differences. In particular, the low atmospheric pressure at high altitudes leads to cavitation and high oil losses.

It is an object of the present invention to eliminate these drawbacks and to provide a pressure system which automatically and in a simple manner effects a regulation of the internal pressure of transmissions.

This object and other objects and advantages of the invention will appear more clearly from the following specification in connection with the accompanying drawing, which schematically illustrates a specific embodiment according to the present invention of a pressure system for a transmission.

The pressure system according to the present invention is characterized primarily by the following features: a pre-pressure or admission pressure chamber which is connected with the atmosphere by a check or back-pressure valve which opens in the direction of said admission pressure chamber; a compressed air generator, for example a pump, the suction side of which is connected to the admission pressure chamber and the pressure side of which is connected to the interior of the transmission; an oil-air separating device, such as an oil thrower, which is connected with the inside of the transmission and with a connecting conduit which leads to the admission pressure chamber; a pressure holding or resistant valve, which is mounted in the connecting conduit between the air exhaust of the oil-air separator and the admission pressure chamber; and a safety or pressure relief valve, by means of which, at the occurrence of excess pressure, the inside of the transmission is connectable to the atmosphere. These features effect a simple closed pressure system, according to which the pressure generator draws in atmospheric air through the admission pressure chamber and the check valve and guides this air into the interior of the transmission. From here, after the oil has been separated, the air passes through the connecting conduit to the pressure valve, which determines the system pressure. When the pressure valve opens, that is, when the pressure inside the transmission is sufficient, the exhaust air returns to the admission or inlet pressure chamber, where the low pressure or partial vacuum is reduced or eliminated and the check valve is closed. To obtain the required reliability of the system against excessive compression, a safety valve is provided, whose minimum pressure for response is greater than the working or operating pressure.

With a pressure system for a transmission which is driven by a gas turbine that is connected to the transmission in such a way that the leakage air delivery of the turbine enters the inside of the transmission, it is proposed according to the present invention that a two-way valve be provided, by means of which the inlet pressure chamber is connectable with the atmosphere. Such a valve may be opened when the gas turbine is operating when at the same time the pressure generator and/or the oil-air separating device are operating. In such an instance, the system operates as an open circuit or cycle. In this way it is now advantageously possible to allow the leakage air from the gas turbine to continuously escape from the pressure system without thereby causing a change in pressure. Since the valve is only opened during operation of the gas turbine and of the pressure generator and oil-air separating device, it will be assured that, neither during shutdown of the gas turbine, nor prior to the inlet pressure chamber being sucked off by the pressure generator, oil losses will occur because of pressure equalization between the inlet pressure chamber and the atmosphere. With a pressure system for a transmission in which the pressure generator is designed as a pump coupled to the turbine, and in which the oil-air separating device is designed as an oil thrower coupled to the turbine, it is proposed according to the present invention that the two-way valve be electromagnetically operable. According to this arrangement, the valve would be opened by sending an impulse to the gas turbine, for instance, the starting impulse, at the same time that the operating impulse, such as an electrically converted operating pressure, is sent to the transmission.

Referring now to the drawing, which illustrates a pressure system according to the present invention for an auxiliary gearbox, which is operated by a gas turbine and according to which a pressure generator designed as a pump and an oil-air separating device designed as an oil thrower are coupled to the transmission, the auxiliary gearbox 1 has drivingly connected thereto a generator 2 and a hydraulic pump 3. The auxiliary gearbox 1 has further (not illustrated) auxiliary or standby units arranged not only within, but also externally thereof. Couplings 4 and 5 allow for further output or drive units, which are likewise not shown. A gas turbine 6 is integrated with the auxiliary gearbox 1 in such a way that the leak air from said turbine 6 feeds into the gearbox 1, as indicated by the dashed line 7 provided with an arrow. The auxiliary gearbox 1 also comprises a pump 8, an oil thrower 9, a pressure holding valve 10, and an inlet pressure chamber 11. The oil thrower 9, through the pressure holding valve 10 and by means of a connecting conduit 14, is communicating with the inlet pressure chamber 11. A check valve 12 and a two-way valve 13 are connected to the inlet pressure chamber 11, allowing the latter to communicate with the atmosphere. The above mentioned structural elements are collectively built into the auxiliary gearbox 1 or are fastened thereto and are merely shown outside the gearbox 1 in the present drawing so that they may be seen. The pump 8 and the oil thrower 9 are coupled to the auxiliary gearbox 1 and always operate when said gearbox does. To secure the auxiliary gearbox 1 against excessive pressure, an excess pressure or safety valve 15 is provided, the minimum pressure of response of which is sufficiently above the operating pressure of the system.

The auxiliary gearbox 1 is essentially set up for two operating conditions. With one operating condition, the gas turbine 6 is cut off. The drive for the auxiliary gearbox 1 or the auxiliary devices is provided by means of the coupling 5 and a not shown main gas turbine. In this connection, the pump 8 sucks air from the atmosphere through the check valve 12 and the inlet pressure chamber 11 and guides it into the interior of the auxiliary gearbox 1. From there the air passes to the oil thrower 9, which separates oil particles out of the air. The air passes through the connecting conduit 14 to the pressure holding valve 10, which opens when the rated pressure is reached, allowing the excess air to flow through the connecting conduit 14 to the inlet pressure chamber 11. This increases the pressure in the inlet pressure chamber 11 and brings about closing the check valve 12 and causing the air to circulate in a closed circuit without pressure change. The operating pressure is chosen in such a way that no cavitation occurs. Nor do oil losses occur, because the vented air in the closed system does not come into contact with the atmosphere.

With another operating condition, whereby the auxiliary gearbox 1 is operated by the gas turbine 6, leakage air from the gas turbine 6 is forced into the interior of the auxiliary gearbox 1. As in the previous operating condition, the pump 8 and the oil thrower 9 operate with the auxiliary gearbox 1. In this connection, the two-way valve 13 is open. The pressure in the system is again determined by means of the pressure holding valve 10, according to which exhaust air, corresponding to the quantity of leakage air, reaches the atmosphere through the two-way valve 13. Since an operating condition is involved here in which the auxiliary gearbox 1 has a predetermined spatial alignment or orientation, the full operability of the oil thrower 9 and the spatial arrangement of the inlet pressure chamber 11 as well as the two-way valve 13 on said inlet pressure chamber 11 will assure that substantially no oil loss will occur.

When changing over from one operating condition to the other one, it is assured, by actively coupling the two-way valve 13 not only with the operating or start impulse for the gas turbine 6, but also with an impulse for the normal speed of the auxiliary gearbox 1, for example, determined by the operating pressure of the pump 8, that the system is closed when the gas turbine 6 is shut down. Opening the system to the atmosphere does not occur until the auxiliary gearbox 1 has reached a sufficient operating speed, so that the inlet pressure chamber 11 is exhausted by the pump 8, and the oil thrower 9 is set into operation. In this manner, undesirable oil losses are avoided.

An electromagnet E is coupled with the two-way valve 13; the electromagnet when current flows therethrough shifts the two-way valve 13 against the force of a spring thereby opening a passage from the inlet pressure chamber 11 to the atmosphere. One conduit of the electromagnet leads to an electrical pressure switch which is connected to the pressure system in a region between the pump 8 and the pressure holding valve 10 and from there to a starting switch of the gas turbine 6 and from there to a current source, for example the plus polarity (positive pole) of a battery. The other end of the electromagnet is connected to the minus polarity of the battery (negative pole). The pressure switch connected to the pressure system is so embodied that a pressure in the system closes the contacts in the switch. If the start switch of the gas turbine 6 is now connected in the position for starting respectively operating and additionally the pump 8 is in operation and pressure exists in the system, accordingly the current circuit is closed and the electromagnet is actuated which leads to a shifting of the two-way valve 13 and a connection of the inlet pressure chamber 11 with the atmosphere.

It is, of course, to be understood that the present invention is, by no means, limited to the specific showing in the drawing, but also comprises any modifications within the scope of the appended claims.

What we claim is:

1. In combination with a transmission and a housing containing the latter, especially an auxiliary gearbox for driving auxiliary devices in aircraft, an inlet pressure chamber, check valve means connected to said inlet pressure chamber and operable in open condition to establish communication of the atmosphere with said inlet pressure chamber, compressed air generating means having a suction side adapted to communicate with said inlet pressure chamber and also having a pressure side adapted to communicate with the interior of said housing, separating means operable to separate oil from air associated therewith, conduit means having said separating means interposed therein and leading from said housing to said inlet pressure chamber, a pressure holding valve interposed in said conduit means between said separating means and said inlet pressure chamber, and safety valve means communicating with said housing means and being operable in response to an excessive pressure within said housing means to establish communication between the interior of said housing means and the atmosphere.

2. An arrangement according to claim 1, in which said compressed air generating means including a pump.

3. An arrangement according to claim 1, in which said separating means includes an oil thrower.

4. An arrangement according to claim 1, which includes a gas turbine drivingly connected to said transmission and so connected thereto that leakage air delivered by said gas turbine is conveyed into said housing, two-way valve means having inlet means adapted to be connected to the atmosphere and having an outlet adapted to be connected to said inlet chamber means, and means operatively connected to said two-way valve means and said gas turbine and said compressed air generating means and said separating means and operable to bring about opening of said two-way valve in response to said gas turbine operating while at least one of said compressed air pressure generating means and said separating means is in operation.

5. An arrangement according to claim 4, which includes electromagnetically operable means operatively connected to said two-way valve for adjusting the same, said electromagnetically operable means being operable to bring about opening said two-way valve in response to an operation impulse of said gas turbine prevailing simultaneously with an operating impulse of said transmission.

6. An arrangement according to claim 5, in which said operating impulse of said gas turbine is a starting impulse, and in which said operating impulse of said transmission is an electrically converted operating pressure.

* * * * *

UNITED STATES PATENT OFFICE
CERTIFICATE OF CORRECTION

Patent No. 4,046,222     Dated Sept. 6, 1977

Inventor(s) Karl Skrivanek, et al

It is certified that error appears in the above-identified patent and that said Letters Patent are hereby corrected as shown below:

On the cover sheet Item 73, should read

[73] Assignee: Klöckner-Humboldt-Deutz Aktiengesellschaft, Cologne, Germany

Signed and Sealed this

Fourteenth Day of February 1978

[SEAL]

Attest:

RUTH C. MASON
*Attesting Officer*

LUTRELLE F. PARKER
*Acting Commissioner of Patents and Trademarks*